(12) United States Patent
Suda et al.

(10) Patent No.: US 8,973,450 B2
(45) Date of Patent: Mar. 10, 2015

(54) ATTITUDE CONTROL DEVICE

(75) Inventors: Yoshihiro Suda, Tokyo (JP); Manabu Kotani, Kakogawa (JP)

(73) Assignee: Yoshihiro Suda, Tokyo (JP)

( * ) Notice: Subject to any disclaimer, the term of this patent is extended or adjusted under 35 U.S.C. 154(b) by 1199 days.

(21) Appl. No.: 12/517,905

(22) PCT Filed: Dec. 6, 2007

(86) PCT No.: PCT/JP2007/073569
§ 371 (c)(1),
(2), (4) Date: Oct. 11, 2010

(87) PCT Pub. No.: WO2008/072542
PCT Pub. Date: Jun. 19, 2008

(65) Prior Publication Data
US 2011/0016996 A1 Jan. 27, 2011

(30) Foreign Application Priority Data
Dec. 12, 2006 (JP) ................................. 2006-333914

(51) Int. Cl.
*G01C 19/24* (2006.01)
*B62D 37/00* (2006.01)
(Continued)

(52) U.S. Cl.
CPC ............... *B62D 37/00* (2013.01); *B61C 17/06* (2013.01); *B61F 5/22* (2013.01); *B62D 37/06* (2013.01); *G01C 19/02* (2013.01); *G01C 19/065* (2013.01); *Y02T 30/18* (2013.01)
USPC ............................................ 74/5.1; 180/54.1

(58) Field of Classification Search
USPC .................... 74/5.1–5.9; 180/218, 65.1, 7.1
See application file for complete search history.

(56) References Cited

U.S. PATENT DOCUMENTS 2,685,206 A * 8/1954 Fillebrown ........................ 74/5.1
2,727,393 A * 12/1955 Summers, Jr. .................... 74/5.7
(Continued)

FOREIGN PATENT DOCUMENTS

DE 101 49 190 B4 4/2007
JP 13878/1993 2/1993
(Continued)

OTHER PUBLICATIONS

European Supplementary Search Report completed on Mar. 5, 2010 and mailed Mar. 19, 2010, EPO Application No. 07850185.
(Continued)

*Primary Examiner* — David M Fenstermacher
*Assistant Examiner* — Zakaria Elahmadi
(74) *Attorney, Agent, or Firm* — Ladas & Parry, LLP

(57) ABSTRACT

The present invention controls rolling motion of a vehicle by eliminating the detrimental influence of gyro moment on the motion of the vehicle and actively using gyro moment generated by a flywheel constituting an energy storing device. The invention relates to an attitude control device for a vehicle mounted with a flywheel as an energy storage device, the flywheel being pivotally supported about first and second axes mutually orthogonal with each other, the flywheel being mounted on a body of the vehicle such that the first axis extends in a front-rear direction of the body, the attitude control device comprising locking means for locking movement of the flywheel about the first axis, wherein a rolling motion of the vehicle is controlled by locking the movement of the flywheel about the first axis using said locking means.

15 Claims, 12 Drawing Sheets

(51) Int. Cl.
*B61C 17/06* (2006.01)
*B61F 5/22* (2006.01)
*B62D 37/06* (2006.01)
*G01C 19/02* (2006.01)
*G01C 19/06* (2006.01)

(56) References Cited

U.S. PATENT DOCUMENTS

| | | | | |
|---|---|---|---|---|
| 3,039,316 A | * | 6/1962 | Slater | 74/5.34 |
| 3,053,099 A | * | 9/1962 | Bennett et al. | 74/5.4 |
| 3,373,832 A | * | 3/1968 | Summers | 180/226 |
| 3,596,523 A | * | 8/1971 | Clark | 74/5.1 |
| 4,009,848 A | * | 3/1977 | Albert et al. | 244/3.16 |
| 4,200,168 A | | 4/1980 | Moog | 180/282 |
| 4,498,015 A | | 2/1985 | Gottfried | 290/15 |
| 4,691,798 A | | 9/1987 | Engelbach | 180/209 |
| 5,820,439 A | * | 10/1998 | Hair, III | 446/233 |
| 6,006,871 A | * | 12/1999 | Leconte et al. | 188/72.4 |
| 6,360,838 B1 | * | 3/2002 | Kulhavy | 180/219 |
| 2002/0059023 A1 | | 5/2002 | Takagi et al. | 701/70 |
| 2009/0254251 A1 | * | 10/2009 | Sato | 701/41 |
| 2010/0018333 A1 | * | 1/2010 | Hamady | 74/5.1 |

FOREIGN PATENT DOCUMENTS

| | | | | | |
|---|---|---|---|---|---|
| JP | 8-297027 A | | 11/1996 | | |
| JP | 08-297027 A | | 11/1996 | | |
| JP | 08297027 | * | 12/1996 | | G01C 19/02 |
| JP | 11-69511 | | 3/1999 | | |
| JP | 11-70822 A | | 3/1999 | | |
| JP | 11-069511 | * | 9/1999 | | B60L 11/18 |
| JP | 2000-159079 A | | 6/2000 | | |
| JP | 2001-058563 | | 3/2001 | | |
| JP | 2003-040095 | | 2/2003 | | |
| JP | 2004-330816 A | | 11/2004 | | |
| JP | 2005-65411 A | | 3/2005 | | |
| JP | 2005065411 | * | 10/2005 | | B60L 11/16 |

OTHER PUBLICATIONS

Yamamoto, Akira. "New Roll/Stability Assist (RS assist) for large-type tractors" Society of Automotive Engineers of Japan, Motor Ring, vol. 19.

Koyanagi, et al. (1989) "Tilt control simulations for a vehicle for a tilting device with control" Japan Society of Mechanical Engineers Journal (Publication C), vol. 55, issue 510, p. 373.

Yukawa, et al. "Tilting control for a vehicle body for a tilt method vehicle" Japan Society of Mechanical Engineers Journal (Publication C), vol. 53, issue 496, pp. 62-12.

ISR for related PCT/JP2007/073569 mailed on Feb. 26, 2008 and its English translation.

IPRP for related PCT/JP2007/073569 issued on Jun. 16, 2009 and its English translation.

* cited by examiner

ATTITUDE CONTROL DEVICE

TECHNICAL FIELD

The present invention relates to an attitude control device, and particularly relates to a device for controlling attitude during the motion of vehicles and rolling stock such as automobiles, coupled vehicles such as large-type trucks and trailers, and railroad vehicle, and etc.

BACKGROUND ART

Energy storage devices that accumulate energy such as recovered brake energy temporarily in order to conserve energy for vehicles etc. have been taken note of. A flywheel device that stores rotational energy of a rotating body rotating at high speed is one such device. A flywheel can provide an energy storage device that accumulates energy acquired from a drive force transmission system of a vehicle as energy of rotation of a flywheel that is then discharged as necessary. For example, when a vehicle decelerates, kinetic energy of the vehicle is recovered via a drive force transmission system. Accumulated energy is then returned to the drive force transmission system so as to assist acceleration when the vehicle accelerates. An auxiliary device for power source is driven by the accumulated energy. For example, a hybrid-type electric vehicle provided with a flywheel includes a flywheel driver generator that rotatably drives the flywheel and generates electricity as a result of rotation of the flywheel, an axle drive generator that rotatably drives an axle and generates electricity using braking energy of the axle, a battery that stores electrical energy at the time of actuation, a generator that generates electricity to rotatably drive the axle drive generator, and a power controller that controls the flywheel driver generator and the axle drive generator. The power controller then ensures that electricity is generated by the flywheel driver generator when vehicle drive power is greater than the electricity generating output of the generator, and ensures that energy is stored at the flywheel using surplus electrical power when the vehicle drive power is less than the generated electrical output and using electrical power generated at the time of braking.

However, a gyro moment is generated because the flywheel device has a rotating mass that rotates at high speed. This gyro moment therefore provides a force that tilts the vehicle body and a force that changes the orientation of the vehicle body. This may be detrimental to the motion of the vehicle body. Devices, such as a double gimbal device, that counteract gyro effects with respect to motion and swing of the vehicle have therefore been proposed. On the other hand, flywheels also have problems from the point of view of mass and size and also demand additional merits in addition to energy storage.

In patent document 1 (JP 11-69511 A), a vehicle drive device is disclosed that suppresses the generation of gyro moment at the flywheel and improves both the efficiency of energy storage and the travelling stability of the vehicle. Specifically, a generator-motor controller controls electrical power supplied to a first generator-motor based on an accelerator signal and a brake signal. Surplus electrical power is then stored in a battery or stored in the flywheel as energy. Electrical power deficiencies are made up for by converting energy stored in the flywheel to electrical power using a second generator-motor for supply to the first generator-motor. The flywheel is supported at a double gimbal bearing. A flywheel attitude controller drives a servo motor in response to swing of the vehicle. The generator-motor controller then controls attitude so that the flywheel does not swing on the absolute coordinates. This device improves the travel stability of the vehicle by eliminating the detrimental influence of the flywheel by controlling the "flywheel attitude" and the flywheel is merely used for energy storage.

A vehicle mounted flywheel type electrical power storage device and a vehicle body attitude control system for a vehicle using this device are disclosed in patent document 2 (JP 2005-65411 A). Patent document 2 disclose technical means that controls the vehicle body by preventing inertial force of the flywheel from having a detrimental effect on the behavior of the vehicle body of the vehicle. Specifically, a flywheel unit having a flywheel rotatably driven by an electric motor capable of generating electricity and a gimbal structure equipped with two rotation supporting units that provide support to this flywheel in a freely rotatable manner about each of an x-axis and a y-axis are provided at a vehicle mounted flywheel type electrical power storage device. A rotation angle sensor (rotation angle detection means) that detects each rotation angle of the flywheel unit at least two rotation supporting units is also provided. Behavior of the body of the vehicle can then be detected by a behavior detection unit provided at a control unit from the detection results of the sensors. More specifically, the flywheel is made to function as a rotor of a gyroscope and a steering wheel and shock absorbers etc. are driven so as to cancel out rolling (for example) by outputting the instruction signals to the steering system and suspension system based on the detected behavior of the vehicle body. The flywheel functions merely as a rotor (detecting means) of the gyroscope in addition to an energy function.

It is therefore an object of the present invention to control rolling motion of a vehicle by eliminating the detrimental influence of gyro moment on the motion of the vehicle and actively using gyro moment generated by a flywheel constituting an energy storing device.

It is another object of the present invention to provide a support structure for a flywheel that is capable of actively employing gyro moment generated by the flywheel.

SUMMARY OF THE INVENTION

According to a first aspect of the present invention, there is provided an attitude control device for a vehicle mounted with a flywheel as an energy storage device, the flywheel being pivotally supported about first and second axes mutually orthogonal with each other, the flywheel being mounted on a body of the vehicle such that the first axis extends in a front-rear direction of the body, the attitude control device comprising locking means for locking movement of the flywheel about the first axis, wherein a rolling motion of the vehicle is controlled by locking the movement of the flywheel about the first axis using said locking means.

In one preferable mode, the attitude control device comprises actuating means for moving the flywheel about the second axis. In a further aspect, the actuating means moves the flywheel about the second axis in the state where the movement of the flywheel about the first axis is locked by the locking means. In one preferable mode, the attitude control device comprises locking means for locking movement of the flywheel about the second axis.

An intersection of the first axis and the second axis preferably coincides with the centre of gravity of the flywheel. One or more flywheels are mounted on the vehicle body, and a plurality of flywheels may be mounted on a single vehicle body. In one preferable mode, the device includes one or more flywheel sets and a set of flywheels is composed of two flywheels rotating in mutually different directions. Second axes of a flywheel set are operatively coupled so as to rotate in mutually different directions. In one preferable mode, the second axes of the flywheel set are operatively coupled so as to rotate by the same amount in mutually different directions.

A coupled vehicle provided with a tractor or trailer, a large type truck, or a vehicle (for example, a naturally tilting vehicle) having a vehicle body tilting function are given as examples of preferable modes for the vehicle. Prevention of rollover of large type trucks and trailers, tilting control of railroad vehicle, rollover prevention of railroad vehicle, and control of lateral wheel load imbalance of railroad vehicle can be given as more specific application examples.

According to a second aspect of the present invention, there is provided an attitude control device for a vehicle having a tilting function and mounted with a flywheel as an energy storage device, the flywheel being pivotally supported about first and second axes mutually orthogonal with each other, the flywheel being mounted on a body of the vehicle such that the first axis extends in a front-rear direction of the body, the attitude control device comprising locking means for locking movement of the flywheel about the first axis; and actuating means for moving the flywheel about the second axis, wherein a rolling motion of the vehicle is controlled by locking the movement of the flywheel about the first axis using the locking means, and the vehicle body is tilted by moving the flywheel about the second axis using the actuating means. In one preferable mode, the attitude control device comprises locking means for locking movement of the flywheel about the second axis. The actuating means and the locking means about the second axis can be constituted by the same device.

A typical example of a vehicle having a vehicle tilting function is a naturally tilting vehicle. Tilting control of a naturally tilting vehicle can be exemplified by the following control. Rotation of the flywheel about the first axis is locked by the locking means at the straight section prior to a bend and a flywheel is actuated to rotate about the second axis in a first direction by the actuating means so as to cause the vehicle to be tilted. At the bending section, in case of a fixed curvature, rotation of the flywheel about the first axis and the second axis is locked by the locking means. Alternatively, tilting is controlled according to curvature. Upon exiting the bend, rolling movement of the vehicle is controlled such that the flywheel is actuated to rotate about the second axis in a second direction opposite to the first direction by the actuating means and the attitudes of vehicle and the flywheel are returned to their initial states. Further, control of rolling motion of the vehicle is carried out, for example, using feedforward and feedback control. It is appreciated that one skilled in the art may optimize timing of locking of flywheel and the timing of actuating of the flywheel according to various conditions.

In one preferred aspect, the flywheel can be one or more flywheel sets composed of two flywheels rotating in mutually different directions, with second axes of each of the two flywheels for a flywheel set being operatively coupled so as to rotate in mutually different directions. In one preferred mode, the device includes locking means for locking rotation of the flywheel about the second axis. The actuating means and the locking means about the second axis can be constituted by the same device.

According to a third aspect of the present invention, there is provided an attitude control device for a vehicle mounted with a flywheel as an energy storage device, the flywheel being pivotally supported about first and second axes mutually orthogonal with each other, the flywheel being mounted on a body of the vehicle such that the first axis extends in a front-rear direction of the body, the attitude control device comprising detecting means for detecting the risk of rollover of the vehicle and locking means for locking movement of the flywheel about said first axis, wherein a rolling motion of the vehicle is controlled by locking the movement of the flywheel about the first axis using the locking means based on detection of the detecting means. In an example of a preferred mode, the vehicle is a coupled vehicle of a tractor and trailer or a large type truck. With the former, the flywheel is provided at the loading platform side, i.e. the trailer, and with the latter, the flywheel is provided at the loading platform side. The flywheel may be preferably provided lower than the centre of gravity of the vehicle.

Detecting means for detecting the risk of rollover of the vehicle is typically exemplified by a gyro sensor (that detects attitude angle and angular velocity) that detects a roll angle and a roll rate and an acceleration sensor that detects lateral acceleration. For example, when the value detected by the detecting means exceeds a predetermined value, control of rolling motion of the vehicle is carried out by locking rotation of the flywheel about the first axis using the locking means. The gyro sensor used as the means for detecting the risk of rollover may be a flywheel.

In one aspect, the device includes actuating means that rotates the flywheel about the second axis. The actuating means carries out control of rolling motion of the vehicle by causing the flywheel to rotate about the second axis when rotation of the flywheel about the first axis is locked by the locking means. The direction of rotation of the flywheel about the second axis when rotation of the flywheel about the first axis is locked can be decided from the direction of rotation of the flywheel and the direction in which force acts on the vehicle body (direction of possible rollover). The direction of rotation of the flywheel is known and the direction of possible rollover can be acquired from the detecting means.

According to the a fourth aspect of the present invention, there is provided a structure for supporting a flywheel that is supported so as to be freely rotatable about a first and second axes, the support structure including locking means that locks rotation of the flywheel about the first and/or the second axis and actuating means that actively rotates drives the flywheel about the first and/or the second axis. The first and second axes are preferably mutually orthogonal.

According to the first to fourth aspects, when the first axis is taken to be an x-axis and second axis is taken to be a y-axis, the axis of rotation of the flywheel is a z-axis that is in a perpendicular direction with respect to the x-y plane. In one preferred mode, the locking means is a brake unit. The brake unit can be exemplified by a friction brake or an electromagnetic brake. In one preferred mode, the actuating means is a motor.

The flywheel of the present invention is capable of eliminating the detrimental influence on the motion of the vehicle due to having a support structure enabling free rotation about two orthogonal axes. The flywheel of the present invention also carries out rolling control of a vehicle by actively utilizing gyro moment generated by the flywheel constituting the energy storing device.

The flywheel is pivotally supported about mutually orthogonal first and second axes and is capable of carrying out rolling control of the vehicle using a simple structure as a result of the flywheel being mounted on the vehicle such that the first axis extends in a direction of from front to rear of the vehicle body and rotation about the first axis being locked during movement of the vehicle.

Tilting of the vehicle can be actively controlled by providing the actuating means that causes the flywheel to rotate about the second axis. The present invention is therefore advantageously applied to attitude control of a vehicle having a vehicle body tilting function.

Rollover of a vehicle can be prevented before it happens by carrying out control of rolling motion of the vehicle by providing the detecting means for detecting the risk of rollover of the vehicle and locking rotation of the flywheel about the first axis based on detection results of the detecting means.

According to the structure for supporting a flywheel that is supported so as to be freely rotatable about a first and second axes, the support structure including locking means that locks rotation of the flywheel about the first and/or the second axis and actuating means that actively rotates drives the flywheel about the first and/or the second axis, it is possible to provide a support structure for a flywheel capable of actively using gyro moment generated by the flywheel.

BRIEF DESCRIPTION OF THE DRAWINGS

FIG. 8A is a coordinate system O-xyz;

FIG. 8B shows a coordinate system G-$\xi_1\eta_1\zeta_1$;

FIG. 8C shows coordinate systems G-$\xi_2\eta_2\zeta_2$, G-$\xi_3\eta_3\zeta_3$;

FIG. 10A is an overall view of the root locus; and FIG. 10B is an enlarged view of portions of FIG. 10A;

FIG. 12A shows displacement of the tilting angle of the vehicle body, FIG. 12B shows gimbal angle displacement, and FIG. 12C shows inputted torque;

DESCRIPTION OF THE INVENTION

[A] Flywheel Support Structure and Arrangement

[A-1] Energy Storage Device Constituted by Flywheel

A flywheel of the present invention acts as an energy storing device when mounted on a vehicle. It is possible to construct an energy storage device from the flywheel by installing an electric motor-generator at the flywheel. The electric motor-generator can be separate from the flywheel or can be built in within the housing of the flywheel. Energy storage can then be carried out using the running energy of the flywheel. The electric motor-generator then operates so as to transfer energy with outside. A motor mounted on a rotating shaft of the flywheel then becomes an electric motor at the time of energy storage. The motor mounted on the rotating shaft of the flywheel then becomes a generator at the time of energy discharge. As disclosed in the background art, construction of energy storage devices employing flywheels is well-known to one skilled in the art. Energy storage devices constructed from flywheels are also disclosed in patent documents 1 and 2. The flywheel of the attitude control device of the present invention adopts a conventional configuration as an energy storing device. An explanation of the specific structure of the energy storage device is therefore not given in the following disclosure of the embodiments.

[A-2] Damping and Attitude Control Using the Flywheel

The way of utilizing the flywheel can be passive or active. In the passive method, torque applied to a rigid body acts to change the angular momentum of the flywheel as the result of changing the angular momentum of the rigid body, which gives rise to the effect of absorption of disturbance torque. In the active method, an effect of amplifying the torque is brought about by torque applied to the rigid body as the result of a change in angular momentum of the flywheel (torque applied to the rigid body can typically be larger than torque applied to the flywheel) by forcibly changing the angular momentum of the flywheel.

[A-3] Flywheel Support Structure

The flywheel of the present invention is a so-called double gimbal support where the flywheel is pivotally supported about a mutually orthogonal first axis and second axes. It is therefore possible to reduce the influence of the flywheel on the vehicle by providing double gimbal support for the flywheel.

Figure 1:
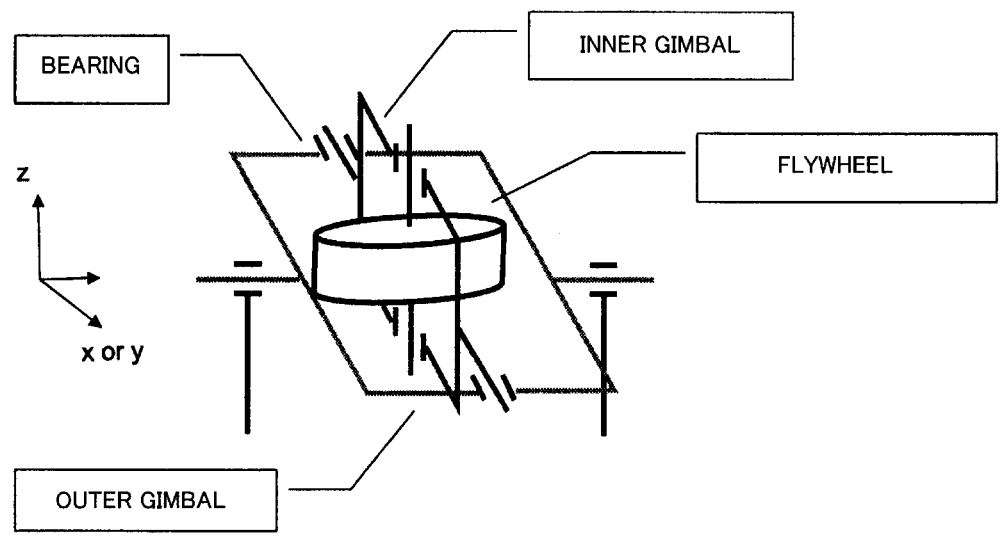
FIG. 1 is a schematic view of a double gimbal support structure for a flywheel.
Figure 4A:
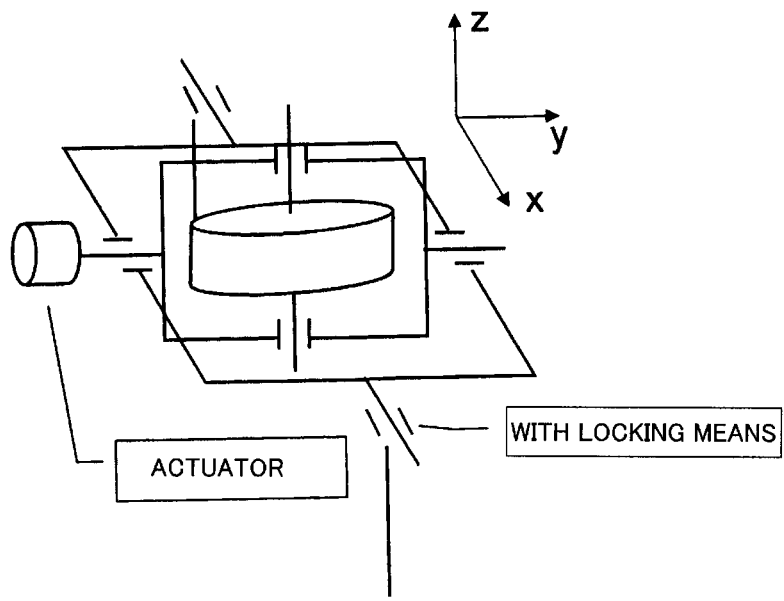
FIG. 4A is a view showing an arrangement structure for one flywheel where a direction of extension of an inner gimbal shaft is taken to be the y-axis, a direction of extension of an outer gimbal shaft is taken to be an x-axis, and a rotating shaft of the flywheel is taken to be a z-axis.
Figure 4B:
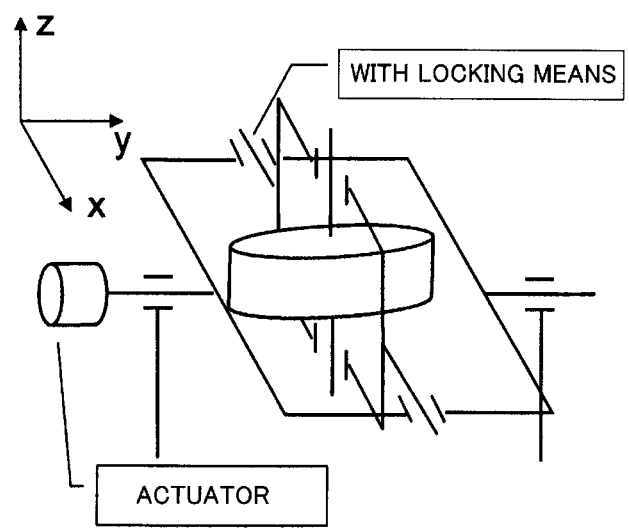
FIG. 4B is a view showing an arrangement structure for one flywheel where a direction of extension of the inner gimbal shaft is taken to be the x-axis, had direction of extension of the outer gimbal shaft is taken to be the y-axis, and the rotating shaft of the flywheel is taken to be the z-axis.

A structure for a double gimbal supported flywheel is shown in FIG. 1. The flywheel includes a disc-shaped rotating mass that rotates at high speed centered about a rotating axis and a housing that houses the rotating mass. The housing is supported in a freely rotatable manner at an inner gimbal via an inner gimbal shaft, and the inner gimbal shaft is supported in a freely rotatable manner at an outer gimbal via an outer gimbal shaft. The inner gimbal shaft and the outer gimbal shaft extend in mutually orthogonal directions and a virtual intersection for the inner gimbal shaft and the outer gimbal shaft coincides with the center of gravity of the flywheel. Coupling of the translational motion of the vehicle and the motion of the flywheel can then be avoided by having the center of gimbal axes and the center of gravity of the flywheel coincide. The inner gimbal axis and the outer gimbal axis extend into an x-y plane and the rotating axis of the rotating mass extends in a z-axis direction perpendicular to the x-y plane. Planer motion is the principal motion for the vehicle and gimbal locking can be avoided by having the rotating axis and the z-axis of the vehicle coincide. In FIG. 1, the direction of extension of the inner gimbal shaft is taken to be the x-axis and the direction of extension of the outer gimbal shaft is taken to be the y-axis but it is also possible for the direction of extension of the inner gimbal shaft to be taken as the y-axis and the direction of extension of the outer gimbal shaft to be taken as the x-axis (refer to FIG. 4A).

Figure 2:
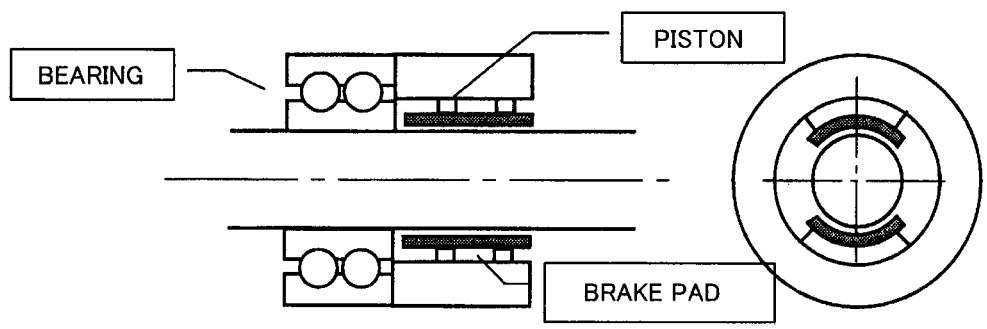
FIG. 2 is a schematic view showing an embodiment of locking means for a gimbal shaft of a flywheel.
Figure 3:
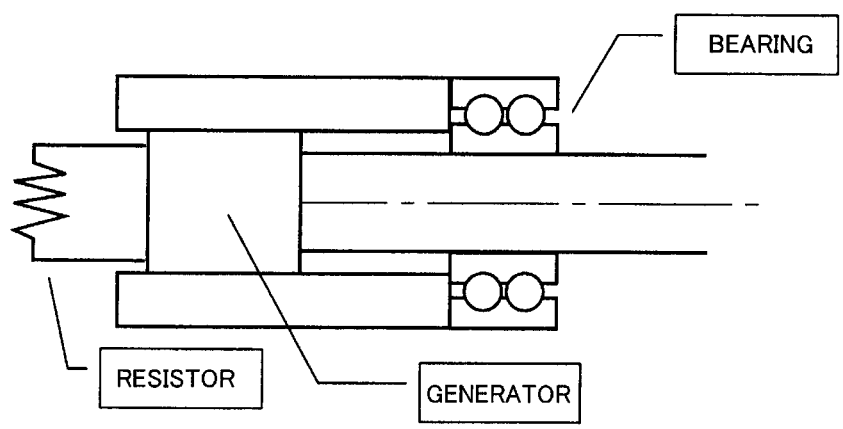
FIG. 3 is a schematic view showing a further embodiment of locking means for a gimbal shaft of a flywheel.

The device of the present invention includes locking means for locking rotation of the flywheel about the x-axis. Locking of the flywheel about the x-axis can be on or off by the locking means. The locking means is typically constituted by a braking means. An example of a friction brake is shown in FIG. 2 as the braking means. The friction brake is provided in the vicinity of the bearing for the shaft supporting the flywheel in a freely rotatable manner. The friction brake is provided with a brake pad and a piston that causes the brake pad to make contact with a surface of the shaft. Rotation of the shaft is locked as a result of actuating the piston. An example of an electromagnetic brake is shown in FIG. 3 as the braking means. At the electromagnetic brake depicted in FIG. 3, a voltage (induced electromotive force) is generated at the generator with a braking action then occurring as a result of the voltage then being consumed as thermal energy by a resistance.

The device of the present invention includes actuating means that actively causes the flywheel to rotate about the y-axis. The actuating means is a so-called actuator, with a motor being shown as an example of the actuator. The locking means and the actuating means may be provided for both rotations about the x-axis and about the y-axis.

[A-3] Flywheel Arrangement Structure

The flywheel of the present invention is mounted on the vehicle so that the x-axis direction coincides with the direction of travel of the vehicle, i.e. coincides with a direction from front to rear of the vehicle body. In a preferred embodiment, the inner gimbal shaft and the outer gimbal shaft are supported in a freely rotatable manner via bearings. The flywheel is then supported so as to be freely rotatable about the x-axis and the y-axis.

An arrangement for the flywheel is shown in table 1.

TABLE 1

|  | ONE FLYWHEEL PER UNIT | TWO FLYWHEELS PER UNIT |
| --- | --- | --- |
| BASIC STRUCTURE | An inner gimbal shaft and an outer gimbal shaft arranged at x and y axes, or y and x axes respectively | Inner and outer gimbal shafts to be x & y axes respectively, two flywheels rotating in opposite directions coupled such that each outer gimbal rotates in opposite directions at 1:1 Implementation: spur gear and etc. |
| LOCKING MEANS | Gimbal shaft about x axis on-off locked by locking means Implementation: friction brake electromagnetic brake | Each inner gimbal shaft on-off locked by locking means Implementation: friction brake electromagnetic brake |
| ACTUATOR | Gimbal shaft about y axis provided with actuator Implementation: motor, and etc. | Outer gimbal shaft provided with actuator at an end thereof Implementation: motor, and etc. |

Figure 5A:
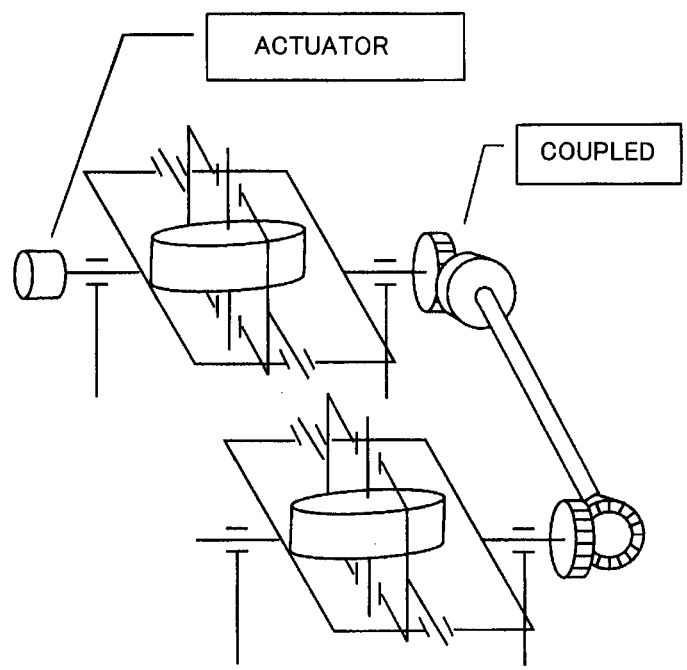
FIG. 5A is a view showing a configuration for an arrangement of the flywheel set composed of two flywheels where two flywheels are arranged to the front and rear, the flywheels rotate in mutually different directions and the gimbal shaft rotating about the x-axis is provided with locking means.
Figure 5B:
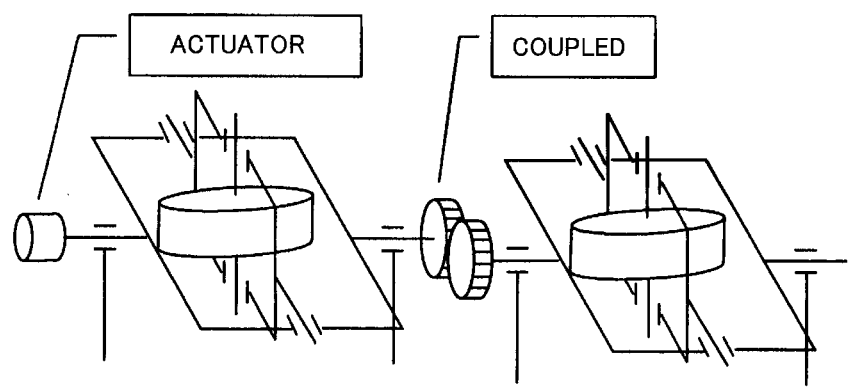
FIG. 5B is a view showing a configuration for an arrangement of the flywheel set composed of two flywheels where two flywheels are arranged to the left and right, the flywheels rotate in mutually different directions and the gimbal shaft rotating about the x-axis is provided with locking means.
Figure 6:
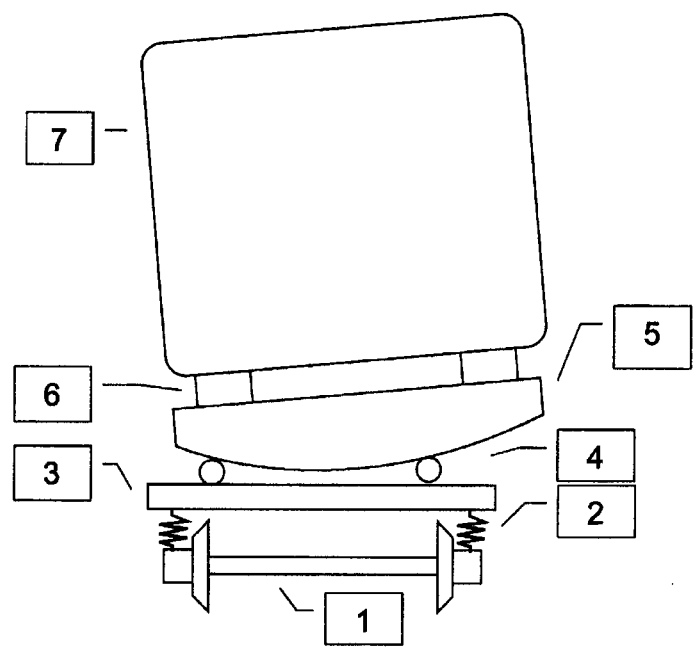
FIG. 6 is a view showing a structure for naturally tilting vehicle in which reference 1 is a wheel axis, reference 2 is a primary spring, reference 3 is a vehicle frame, reference 4 is a roller and bearing guide etc., reference 5 is a tilt beam, reference 6 is a secondary spring, and reference 7 is a vehicle body.

The flywheel can be mounted on the vehicle as one flywheel per unit but it is also possible to construct one unit from a plurality of flywheels and mount a plurality of flywheels on a vehicle. It is possible to reduce the influence of motion about the z-axis of the vehicle by adopting a symmetrical structure of two flywheels per one unit. Describing this based on an arrangement structure of two flywheels per one unit, two flywheels provided with rotating masses that rotate in mutually different directions are prepared. The two flywheels are then arranged to the front and the rear (x-axis direction) or are arranged to the left and the right (y-axis direction), as shown in FIG. 5. The gimbal shaft rotating about the x-axis is provided with the locking means. The gimbal shafts rotating about the y-axis for each flywheel are operatively coupled so as to rotate in opposite directions at a ratio of 1 to 1. A spur gear is exemplified as a transmission coupling unit.

A device of the present invention includes a control unit for controlling the locking means and actuating means respectively. The locking means restricts rotation of the flywheel upon receipt of instructions from the control unit based on the detecting means and the actuating means causes the flywheels to rotate. Control by the control unit based on the detecting means differs depending on the purpose of the attitude control. For example, in attitude control of a naturally tilting vehicle, the locking means restricts rotation of the flywheels about the axis in the travelling direction (x-axis) using instructions from the control unit and the actuating means causes the flywheel to rotate about the y-axis based on detection. Further, in control to prevent rollover of large type trucks or coupled vehicles, the locking means restricts rotation of the flywheel about the axis (x-axis) for the travelling direction of the flywheel using instructions from the control unit based on detection by a lateral acceleration detecting means. Further, the actuating means causes the flywheel to rotate about the y-axis. The flywheel may constitute a portion of the detection unit. A relationship between the direction of rotation of the flywheel (rotating mass), the direction of rotation about the y-axis, and the tilt direction of the vehicle (about the x-axis) is shown in table 2. It is possible to determine the direction of inclination of the vehicle by selecting rotation about the y-axis by the control unit depending on the direction of rotation of the flywheel (rotating mass).

TABLE 2

 +: DIRECTION OF EACH AXIS ROTATING ABOUT DIRECTION OF RIGHT HAND THREAD

| TILT DIRECTION OF VEHICLE | | AXIS OF ROTATION (Z AXIS) | |
|---|---|---|---|
| | | + | − |
| TILT DIRECTION OF VEHICLE (X AXIS) | + | − | + |
| | − | + | − |

(INDICATE ROTATING DIRECTION ABOUT Y AXIS)

[A-4] Application of Flywheel

An example of application to a naturally tilting vehicle and application to large type trucks and coupled vehicles are given as preferred example applications of the flywheels of the present invention. With railroad vehicles, a vehicle mountable energy storage device is necessary to take into consideration regenerative lapses and hybrid train. Tilting vehicles (naturally tilting vehicles, forced tilting vehicles) have been implemented in order to provide compatibility with deterioration in riding comfort that accompanies increases in speed of travel around bends. Active tilt control using air pressure cylinders etc. has also been carried out in order to eliminate the problem of tilt delays occurring in naturally tilting vehicles. It is possible to simultaneously resolve to problems of energy storage and tilt delays occurring in naturally tilting vehicles by carrying out tilt control of naturally tilting vehicles using a flywheel type energy storing device.

It is also useful if braking energy can be recovered because of the size of braking energy in coupled vehicles such as large vehicles and trailers. With coupled vehicles, understanding of the centre of gravity with respect to tread length and understanding of the state of the trailer for a tractor/trailer structure is difficult and the danger of rolling over is therefore high. Active stabilizers are used as a conventional method of preventing rollover but this method is physically limited because of the action of relative displacement. Techniques that employ active steering and brake control also exist but while reducing lateral acceleration and lateral force of an outer tire, such techniques hinder z-axis rotation of the vehicle. It is possible to simultaneously resolve the problems of energy storing and preventing rollover of couple vehicles by adopting a flywheel type energy storing device.

Modes for applying the flywheels of the present invention to railroad vehicles and large type vehicles and trailers are shown in table 3. At the naturally tilting vehicle, it is preferable to use a symmetrical structure of two flywheels to one unit in order to put the gimbal angle to 0 degrees before and after passing through a bend. A plurality of units may be installed at the vehicle. A detailed configuration is described in the following.

TABLE 3

| | RAILROAD VEHICLE | LARGE TRUCK COUPLED VEHICLE |
|---|---|---|
| SUPPORTING STRUCTURE | TWO FLYWHEELS PER UNIT | TWO FLYWHEELS PER UNIT ONE FLYWHEEL PER UNIT |
| INSTALLATION POSITION | UPPER PORTION OF CAR | LARGE TRUCK: WAGON COUPLED VEHICLE: TRAILER |
| ACTUATOR | YES | YES OR NO |

[B] Natural Tilting Control Using a Flywheel

With railroad vehicles, improvements in riding comfort that deteriorates as a result of excessive centrifugal acceleration that cannot be compensated for at super elevations have been problematic when implementing improvements in speeds of travel around bends. A naturally tilting vehicle is one way of resolving this. In the naturally tilting method, the mass of the vehicle body is substantial. Fluctuations in centrifugal force at gentle bends therefore cannot be followed and delays in tilting occur. This phenomenon is detrimental to riding comfort. Tilting devices with control that can make a tilting action such as due to an air compression cylinder active have therefore been developed. Tilting control device for a vehicle body is disclosed in, for example, the Japan Society of Mechanical Engineers Journal (Publication C), volume 55, issue 510 (1989, 373), "tilt control simulations for a vehicle for a tilting device with control", by Koyanagi, Okamoto, Fujimori, Terada, Kaigaki, and Hiraishi. Tilting control for a vehicle body for a tilt method vehicle is also disclosed in the Japan Society of Mechanical Engineers Journal (Publication C) volume 53, issue 496 (Sho. 62-12) by Yasushi Yukawa, Isao Okamoto, Shiro Koyanagi, Souji Fujimori, Kenjirou Kasai, and Katsuyuki Terada. A tilt device with control is a device where an air cylinder for controlling a tilt angle of a vehicle is installed at a portion of a roller device of a roller type naturally tilting device. Positions of bends are detected during travelling. An air pressure servo valve is then actuated by instructions from a computer, pressurized air is sent to the air cylinder, and tilting of the vehicle body is controlled. A system configuration includes a portion comprised primarily of an instruction control device for detecting the position of bends, a tilt control device portion that outputs control signals necessary for tilting of the vehicle body based on the bend position detection signal, and an air servo mechanism.

In the above document, a method is adopted for calculating a travelling position from a position of an ATS ground element and rotational speed of the wheels as a method for detecting the position of bends. Namely, a distance from an existing ATS ground element to an entrance to a smooth bend that is a control target bend is checked in advance for all curvatures of the target railway section and is stored in an instruction control device on the vehicle as bend position information. A ground element is detected by the vehicle while travelling and a distance from passing through can be calculated from the rotational speed of wheels and the diameter of the vehicle wheels at this time. It is possible to accurately detect the position of the bend by comparing the bend position information in the instruction device and this calculated distance continuously. According to the vehicle body tilting method, detecting means for detecting the position of bends detects a position a predetermined distance (20 m to 50 m) before an entrance of the gentle bend. A timing signal for tilting and bend information (radius of curvature, circular bend length, gentle bend length, amount of super elevation, etc.) are then sent from the instruction control device at the time this point is passed through. According to the tilting control device, a target value for tilting control signal necessary for providing predetermined tilting to the vehicle body corresponding to a prescribed tilting control mode is calculated from the bend information and the travelling speed. A tilting instruction is then outputted to the servo amplifier before the entrance of the gentle bend. The servo valve is then actuated by the output signal, the air cylinder is controlled, and the vehicle body is tilted. A signal from a tilt angle meter mounted on a wagon is then fed back and the role angle of the vehicle body is then corrected in line with changes in the travelling speed by carrying out the above calculation continuously.

Figure 7A:
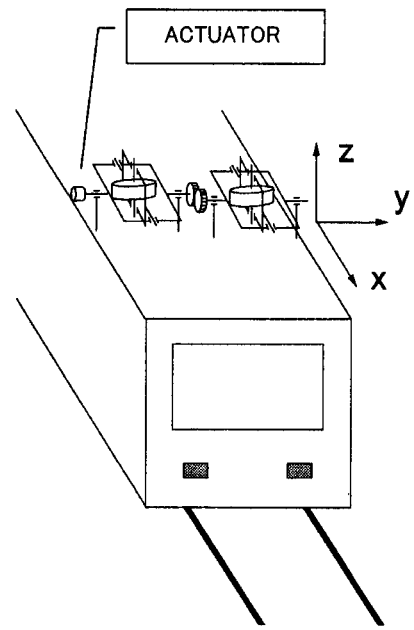
FIG. 7A is a view illustrating arrangement of a flywheel set comprised of two flywheels at a naturally tilting vehicle where the flywheels are provided at an upper part of the vehicle body and two flywheels are arranged to the left and right.
Figure 7B:
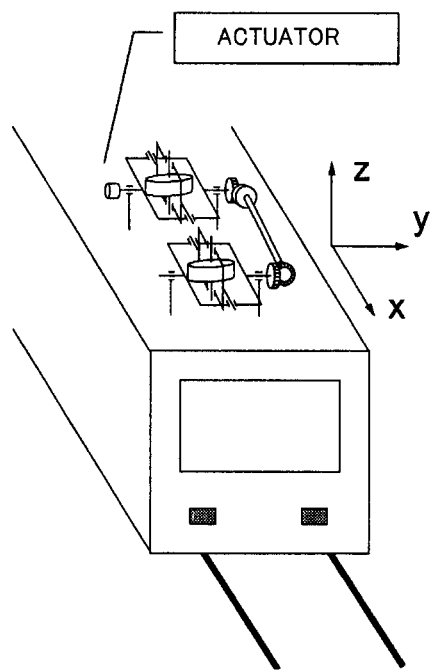
FIG. 7B is a view illustrating arrangement of a flywheel set comprised of two flywheels at a naturally tilting vehicle where the flywheels are provided at an upper part of the vehicle body and two flywheels are arranged to the front and rear.

The present invention makes the flywheel function as one type of moment amplifying device by utilizing the flywheel using an active type, with the vehicle body being tilted as a result. As for an arrangement of flywheel, flywheels are arranged at an upper part of the vehicle where two flywheels constitute one unit, exemplified in FIG. 7. A plurality of flywheel sets comprised of two flywheels per one unit may be arranged. The two flywheels are arranged in parallel in the x-axis direction or the y-axis direction. The two flywheels rotate in mutually different directions. The locking means is provided at the gimbal shafts in the x-axis direction of each of the flywheels constituting two flywheels per one unit. Rotation of the flywheel about the x-axis can be locked using the locking means. The gimbal shafts for the y-axis direction can also be locked by locking means (not shown). The y-axes of each flywheel couple so as to be rotated in opposite directions by a spur gear etc. When one gimbal shaft is then made to rotate in a first direction by an actuator, the other gimbal shaft rotates in an opposite second direction.

A specific attitude control method is as described in the following. With routes where a gentle bend is short, the vehicle body is gradually tilted from a straight portion prior to the gentle bend and is gradually returned at the exit of the bend. In the section where the vehicle body is tilted, the gimbal about the x-axis is locked at the straight section prior to the bend, and the vehicle body is tilted by causing the gimbal to rotate about the y-axis using an actuator. Both gimbals are locked at the bent section. The gimbal is then made to rotate about the y-axis by an actuator at the exit of the bend and the tilted the vehicle body and the gimbal angles are returned to their initial state.

A description is now given of a tilt control system. The tilting control system for gentle bends can be implemented by feedforward and feedback controller by using the feature that railroad vehicle always travels along a predetermined route. Feedforward torque can be denoted by:

$$-J\Omega\dot{\phi}_r \qquad \text{[Equation 1]}$$

Where $J\Omega$:flywheel angular momentum (for two flywheels), $\phi_r$:control target value. Shifting from the target value is then compensated for using feedback control. The gimbal angle is then returned to 0 degrees coming out of the gentle bend. This can be implemented by using a symmetrical structure of two flywheels per one unit. A tilting control system for a constant bend can be carried out by retaining a gimbal angle. Regarding the receiving of control signals, it is possible to receive bend information from existing installations such as ATS etc. The tilt angle can be measured from change relative to the wagon as in the related art.

At an explanation is now given of when travelling in a straight portion and of a failsafe. Normally, the inner gimbal shaft and the outer gimbal shaft are both free and the flywheels freely rotate passively about the x-axis and the y-axis. It is possible to improve stability when travelling in the straight portion by improving stability of the vehicle about x-axis by locking the inner gimbal shaft. Further, as a failsafe when travelling along a bend, if the actuator about the gimbal shaft fails, rotation of the gyroscope about the x-axis may be taken to be free to obtain a failsafe state the natural tilting is provided with.

A low degree of freedom dynamic model is derived and examination of parameters for the gyroscope and design of control unit are carried out in order to apply an active gyroscope damping mechanism to a naturally tilting vehicle. Utilization of the system will be shown by numerical simulation using this. For ease of explanation etc, in the numerical simulation, calculation is carried out based on the flywheel supported so as to be capable of rotation at one axis but application of the technical idea described here to a two axis support mechanism can also be understood by one skilled in the art.

[Dynamic Model]

Degrees of freedom of lateral rolling and yawing of the vehicle body, lateral rolling and yawing of each carriage frame and lateral yawing of each wheel axis can be provided as degrees of freedom for a lateral system while analyzing the dynamics of typical railroad vehicle. A degree of freedom for rolling of the vehicle body only is provided here for simplification. Namely, it is taken that the wheel axes and the wagons are restrained integrally at the railway.

The gyroscope can be mounted on the vehicle by a single gimbal support providing a degree of freedom using a gimbal to one orthogonal axis other than the rotating axes. This corresponds to a state of locking rotation about one axis in the double gimbal support structure mentioned previously. At the straight section before the smooth bend, the rotating shaft is taken to orient in the vertical direction and the centre of gravity of the vehicle body and the centre of gravity of the gyroscope are taken to coincide. The rotational speed of the gyroscope is taken to be constant and only the angular displacement of the gimbal is considered as a degree of freedom.

[Coordinate System]

Figure 8A:
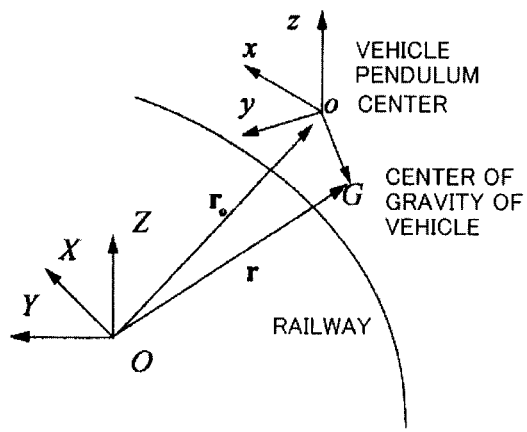
FIGS. 8A, 8B and 8C are views showing a coordinate system employing attitude control for a railway vehicle, where
Figure 8B:
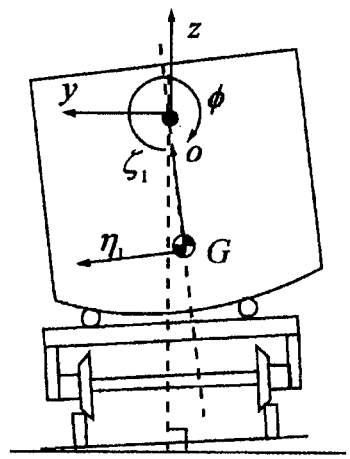
Figure 8C:
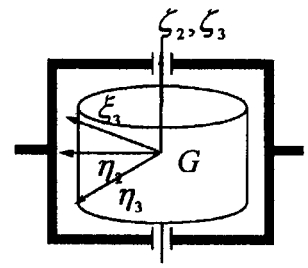

With respect to an inertial coordinate system O-XYZ, a tilting rotation centre is taken as an origin, the direction of travel of the vehicle, i.e. a direction from front to rear of the vehicle body is taken to be the x-axis, and the vertical direction is taken to be the z-axis, and a coordinate system o-xyz is obtained by rotating ψ about the z-axis of the inertial coordinate system. The coordinate system o-xyz is shown in FIG. 8A. Taking the centre of gravity of the vehicle body as an origin, the coordinate system o-xyz is set to rotate about the x-axis and the vehicle body coordinate system rotating about φ is set to G-$\xi_1\eta_1\zeta_1$. The vehicle body coordinate system G-$\xi_1\eta_1\zeta_1$ is shown in FIG. 8B. The vehicle body coordinate system G-$\xi_1\eta_1\zeta_1$ is set to the gimbal coordinate system G-$\xi_2\eta_2\zeta_2$ made to rotate by θ about $\eta_1$. The gimbal coordinate system G-$\xi_2\eta_2\zeta_2$ is set to be gyroscope coordinate system G-$\xi_3\eta_3\zeta_3$ made to rotate by $\Omega_t$ about the $\zeta_3$ axis. The gimbal coordinate system G-$\xi_2\eta_2\zeta_2$ and the gyroscope coordinate system G-$\xi_3\eta_3\zeta_3$ are shown in FIG. 8C.

The main symbols are as described below.

TABLE 4

| | |
|---|---|
| r: | Position vector for center of gravity of vehicle represented by inertial coordinate system |
| $r_0$: | Position vector for center of vehicle pedulum represented by inertial coordinate system |
| $s_o'^G$: | Position vector for center of gravity of vehicle represented by o-xyz coordinate system |
| $I_1 = \text{diag}(I_{\xi_1}\ I_{\eta_1}\ I_{\zeta_1})$: | Inertial tensor of vehicle |
| $I_3 = \text{diag}(I_{\xi_3}\ I_{\eta_3}\ I_{\zeta_3})$: | Inertial tensor of gyro |
| $\omega_1$: | Angular velocity vector for vehicle coordinate system |
| $\omega_3$: | Angular velocity vector for gyro coordinate system |
| $m_V$: | Mass of vehicle |
| $m_G$: | Mass of gyro |
| l: | Distance from center of vehicle pendulum to center of gravity of vehicle |
| h: | Height of center of vehicle pendulum when travelling along straight section |
| V: | Travelling velocity of vehicle |
| Ω: | Angular velocity of rotaion of gyro |
| k: | Spring constant about gimbal axis |
| $C_V$: | Viscous damping coefficient about roller portion |
| c: | Viscous damping coefficient about gimbal shaft |
| φ: | Vehicle tilt angle to vertical axis |
| $\phi_r$: | Target vehicle tilt angle to vertical axis |
| $\phi_0$: | Angle of super elevation |
| θ: | Gimbal angle |
| C: | Amount of super elevation |
| u: | Inputted torque about gimbal shaft |
| g: | Gravitaional acceleration |
| $A = \begin{bmatrix} \cos\psi & -\sin\psi & 0 \\ \sin\psi & \cos\psi & 0 \\ 0 & 0 & 1 \end{bmatrix}$: | Transformation matrix from o-xyz coordinate system to inertial coordinate system |
| $R_x(\phi) = \begin{bmatrix} 1 & 0 & 0 \\ 0 & \cos\phi & \sin\phi \\ 0 & -\sin\phi & \cos\phi \end{bmatrix}, R_y(\theta) = \begin{bmatrix} \cos\theta & 0 & -\sin\theta \\ 0 & 1 & 0 \\ \sin\theta & 0 & \cos\theta \end{bmatrix}$ | |

[Equation of Motion]

The equations of motion for this dynamic model are derived using Legrange's equation of motion. Generalized coordinates are taken to be φ and θ. Regarding kinetic energy, kinetic energy relating to translation of the vehicle body and the centre of gravity of the gyroscope is taken to be $T_1$, kinetic energy relating to rotation about the centre of gravity of the vehicle body is taken to be $T_2$, and kinetic energy relating to rotation about the centre of gravity of the gyroscope is taken to be $T_3$. For simplicity, the gimbal inertia tensor is taken to be 0. The respective kinetic energies are then as follows:

$$T_1 = \frac{1}{2}(m_V + m_G)\dot{r}^T\dot{r}, \quad \text{[Equation 2]}$$

$$T_2 = \frac{1}{2}\omega_1^T I_1 \omega_1,$$

$$T_3 = \frac{1}{2}\omega_3^T I_3 \omega_3$$

where, $r = r_0 + As_o'^G$, then $\dot{r} = \dot{r}_0 + \dot{A}s_o'^G + A\dot{s}_o'^G$ $$\dot{r}_0 = A[V\ 0\ 0]^T$$

$$s_o'^G = [0\ l\sin\phi\ -l\cos\phi]^T$$

$$\omega_1 = R_x(\phi)[0\ 0\ \dot{\psi}]^T + [\dot{\phi}\ 0\ 0]^T$$

$$\omega_3 = \begin{bmatrix} \cos\Omega t & \sin\Omega t & 0 \\ -\sin\Omega t & \cos\Omega t & 0 \\ 0 & 0 & 1 \end{bmatrix}\left(R_y(\theta)\omega_1 + \begin{bmatrix} 0 \\ \dot{\theta} \\ 0 \end{bmatrix}\right) + \begin{bmatrix} 0 \\ 0 \\ \Omega \end{bmatrix}$$

With regards to potential energy, potential energy due to the centre of gravity is taken to be $U_1$, and potential energy due to a spring about the gimbal shaft is taken to be $U_2$, so as to give the following.

$$U_1 = (m_V + m_G)g\left\{h\cos\phi_0 + \frac{G}{2}\sin\phi_0 - l\cos\phi\right\}, \quad \text{[Equation 3]}$$

$$U_2 = \frac{1}{2}k\theta^2$$

The following equation of motion can then be derived by applying Legrange's equation of motion.

$$\{I_{\xi_1}+I_{\zeta_3}+(m_V+m_G)l^2\}\ddot{\phi}+C_V\dot{\phi}=-I_{\zeta_3}\Omega\dot{\theta}\cos\theta-(m_V+m_G)lV\dot{\psi}\cos\phi+C_V\dot{\phi}_0-(m_V+m_G)gl\sin\phi+I_{\zeta_3}\dot{\psi}\dot{\theta}\cos\phi-I_{\zeta_3}\Omega\dot{\psi}\cos\phi+\{(m_V+m_G)l^2+I_{\eta_1}-I_{\xi_1}\}\dot{\psi}^2\sin\phi\cos\phi \quad \text{[Equation 4] and (1)}$$

$$I_{\zeta_3}\ddot{\theta}+c\dot{\theta}+k\theta=I_{\zeta_3}\Omega\dot{\phi}\cos\theta-I_{\zeta_3}(\ddot{\psi}\sin\phi+\dot{\psi}\dot{\phi}\cos\phi)-I_{\zeta_3}\Omega\dot{\psi}\cos\phi\sin\theta+u \quad (2)$$

Here, nonconservative force becomes:

$$Q_\phi^{nc}=-C_V(\dot{\phi}-\dot{\phi}_0), Q_\theta^{nc}=-c\dot{\theta}+u \quad \text{[Equation 5]}$$

Here, for simplicity it is taken that $I_{\xi_3}=I_{\zeta_3}$. When the angular displacements φ and θ are taken to be sufficiently small and equations (1) and (2) are approximated, this is shown by the following equation.

[Equation 6]

$$\begin{bmatrix} I_{\xi_1} + I_{\zeta_3} + (m_V + m_G)l^2 & 0 \\ 0 & I_{\zeta_3} \end{bmatrix}\begin{bmatrix} \ddot{\phi} \\ \ddot{\theta} \end{bmatrix} + \begin{bmatrix} C_V & I_{\zeta_3}\Omega \\ -I_{\zeta_3}\Omega & c \end{bmatrix}\begin{bmatrix} \dot{\phi} \\ \dot{\theta} \end{bmatrix} + \begin{bmatrix} (m_V + m_G)gl & 0 \\ 0 & k \end{bmatrix}\begin{bmatrix} \phi \\ \theta \end{bmatrix} \quad (3)$$

$$= \begin{bmatrix} -(m_V+m_G)lV\dot{\psi}+C_V\dot{\phi}_0+\{(m_V+m_G)l^2+I_{\eta_1}-I_{\xi_1}\}\dot{\psi}^2\phi+I_{\zeta_3}\dot{\psi}\dot{\theta}-I_{\zeta_3}\Omega\dot{\psi}\phi \\ -I_{\zeta_3}(\ddot{\psi}\phi+\dot{\psi}\dot{\phi})-I_{\zeta_3}\Omega\dot{\psi}\theta \end{bmatrix} + \begin{bmatrix} 0 \\ u \end{bmatrix}$$

A half-wavelength sine curve is then applied to the extent of super elevation and the curvature of the curve at the gently curving portion when handling bends. Curvature and amount of super elevation with respect to the distance from the starting point of the gentle bend are expressed by the following equations.

$$R = \frac{2R_0}{1 - \cos\frac{\pi}{X_L}x}, \quad C = \frac{C_0}{2}\left(1 - \cos\frac{\pi}{X_L}x\right) \quad \text{[Equation 7]}$$

Here, symbols such as $R_0$: radius of curvature of a circular bend, $C_0$: extent of super elevation of a circular bend, G: gauge, $X_L$: gentle bend length, x: distance from gentle bend starting point, are used.

[Adjustment of Gyroscope Parameters]

Reducing of equation (3) can be expressed by the following equation.

[Equation 8]

$$\begin{bmatrix} I & 0 \\ 0 & J_y \end{bmatrix}\begin{bmatrix} \ddot{\phi} \\ \ddot{\theta} \end{bmatrix} + \begin{bmatrix} C_V & J\Omega \\ -J\Omega & c \end{bmatrix}\begin{bmatrix} \dot{\phi} \\ \dot{\theta} \end{bmatrix} + \begin{bmatrix} K & 0 \\ 0 & k \end{bmatrix}\begin{bmatrix} \phi \\ \theta \end{bmatrix} = \begin{bmatrix} T_\phi \\ T_\theta \end{bmatrix} + \begin{bmatrix} 0 \\ 1 \end{bmatrix}u \quad (4)$$

Here, symbols are substituted as in the following.

[Equation 9]

$$I = I_{\zeta 1} + I_{\zeta 3} + (m_V + m_G)l^2,$$

$$J = J_y = I_{\zeta 3}, \quad K = (m_V + m_G)gl$$

$$T_\phi = -(m_V + m_G)lV\dot{\psi} + C_V\dot{\phi}_0 +$$

$$\{(m_V + m_G)l^2 + I_\eta - I_{\zeta 1}\}\dot{\psi}^2\phi + I_{\zeta 3}\dot{\psi}\dot{\theta} - I_{\zeta 3}\Omega\dot{\psi}\phi$$

$$T_\theta = -I_{\zeta 3}(\ddot{\psi}\phi + \dot{\psi}\dot{\phi}) - I_{\zeta 3}\Omega\dot{\psi}\theta$$

$$\omega_\phi = \sqrt{\frac{K}{I}}, \quad \omega_\theta = \sqrt{\frac{k}{J_y}}, \quad \zeta_\phi = \frac{C_V}{2\sqrt{IK}},$$

$$\zeta_\theta = \frac{c}{2\sqrt{J_yk}}, \quad \mu = \frac{J^2\Omega^2}{IJ_y\omega_\phi^2}, \quad v = \frac{\omega_\theta}{\omega_\phi}, \quad a = \frac{J_y}{I}$$

When equation 9 is variably transformed using these symbols, when it is taken that dimensionless time $\tau = \omega_\phi t$ and equation (4) is made dimensionless, this can be expressed by the following equation.

[Equation 10]

$$\begin{bmatrix} 1 & 0 \\ 0 & 1 \end{bmatrix}\begin{bmatrix} \phi'' \\ \theta'' \end{bmatrix} + \begin{bmatrix} 2\zeta_\phi & \sqrt{\mu a} \\ -\sqrt{\frac{\mu}{a}} & 2v\zeta_\theta \end{bmatrix}\begin{bmatrix} \phi' \\ \theta' \end{bmatrix} + \begin{bmatrix} 1 & 0 \\ 0 & v^2 \end{bmatrix}\begin{bmatrix} \phi \\ \theta \end{bmatrix} = \begin{bmatrix} 0 \\ \frac{1}{J_y\omega_\phi^2} \end{bmatrix}u \quad (5)$$

Adjustment of parameters for the vehicle body and the gyroscope system is examined because items such as suppression of angular displacement of the gimbals and improvement of transient characteristics etc. are required during implementation of vehicle tilting using a gyroscope.

[Suppression of Angular Displacement of the Gimbals]

As shown in the equation of motion in the preceding paragraph, gyroscope moment is such that the direction of torque generated also changes together with rotation of the gimbal angle. It is therefore also preferable to suppress angular displacement of the gimbal angle. Suppression of angular displacement of the gimbals is examined from a frequency response curve. When attenuation constants $\zeta_\phi$, $\zeta_\theta$ are taken to be 0, the resonance frequency becomes:

$$\omega = \omega_\phi\sqrt{\left(1 + \mu + v^2 \pm \sqrt{(1 + \mu + v^2) - 4v^2}\right)/2} \quad \text{[Equation 11]}$$

Specifically, there is only one resonance frequency when a spring is not present about the gimbal shaft:

$$\omega = \omega_\phi\sqrt{1+\mu} \quad \text{[Equation 12]}$$

Amplitude power from equation (5) can then be expressed by the following equations.

[Equation 13]

$$\left|\frac{\phi}{\phi_{st}}\right| = \frac{\sqrt{\mu/a}\,\lambda}{[\{(v^2 - \lambda^2)(1 - \lambda^2) - (4v\zeta_\phi\zeta_\theta + \mu)\lambda^2\}^2 + 4\lambda^2\{(v^2\zeta_\phi + v\zeta_\theta) - (\zeta_\phi + v\zeta_\theta)\lambda^2\}^2]^{1/2}} \quad (6)$$

$$\left|\frac{\theta}{\theta_{st}}\right| = \frac{v^2\{(1-\lambda^2)^2 + (2\zeta_\phi\lambda)^2\}^{1/2}}{[\{(v^2 - \lambda^2)(1 - \lambda^2) - (4v\zeta_\phi\zeta_\theta + \mu)\lambda^2\}^2 + 4\lambda^2\{(v^2\zeta_\phi + v\zeta_\theta) - (\zeta_\phi + v\zeta_\theta)\lambda^2\}^2]^{1/2}}$$

Here, symbols of static angular displacement of the vehicle body with respect to the input torque $\phi_{st}=\mu/K$, static angular displacement of a gimbal with respect to the input torque $\theta_{st}=\mu/k$, and a force frequency ratio $\lambda=\omega/\omega_\phi$ are used. It can therefore be understood that an anti-resonance point exists in the vicinity of the intrinsic angular frequency of the vehicle body for the amplitude factor of the gimbal angle from equation (6). It can be considered to implement the suppression of angular displacement of a gimbal by making a ratio of gain from the input torque to the gimbal angle and gain from the input torque to the vehicle body tilting angle small. The ratio of gain to the gimbal angle and gain from the input torque to the vehicle body tilting angle can be denoted by the following equation.

[Equation 14]

$$\left|\frac{\phi(j\omega)}{u(j\omega)} \middle/ \frac{\theta(j\omega)}{u(j\omega)}\right| = \frac{J\Omega}{I}\frac{\omega}{\sqrt{(\omega_\phi^2 - \omega^2)^2 + (2\zeta_\phi\omega_\phi\omega)^2}} \quad (7)$$

Figure 9:
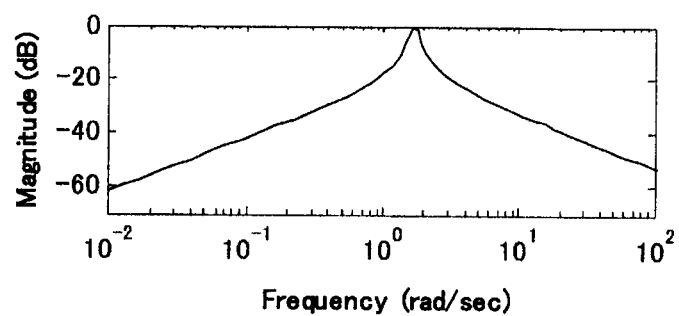
FIG. 9 is a view showing a frequency response curve for a gain ratio.

A frequency response curve for equation (7) is shown in FIG. 9. It can therefore be understood that it is possible to suppress angular displacement of a gimbal by making the ratio of angular displacement of the gyroscope with respect to the initial moment of the vehicle large, and by having the angular frequency of forced vibrations approach and the intrinsic angular frequency of the vehicle body tilting.

[Improving Transient Characteristics]

Figure 10A:
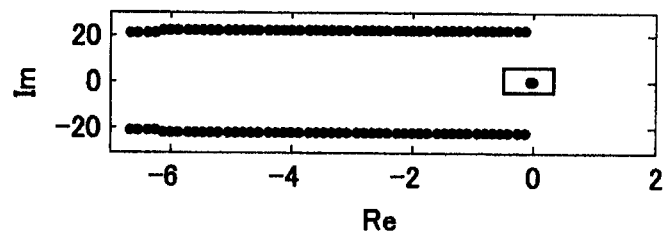
FIGS. 10A and 10B are views showing a root locus when a damping coefficient is changed about a gimbal shaft, where
Figure 10B:
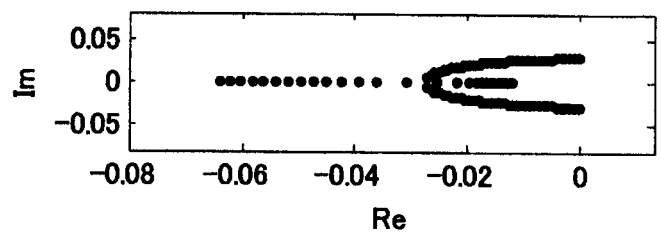

The real part of the representative pole is made large on the negative side in order to obtain rapid convergence of a free response. A root locus for when a damping coefficient for about the gimbal shaft is changed is shown in FIG. 10. It can be understood that the real part of the representative pole becomes large on the negative side together with an increase in the damping coefficient. Further, it can be understood that the damping coefficient for about the gimbal shaft does not appear in equation (7) and suppression of the angular displacement of the gimbal and the transient response can therefore be handled independently.

[Control Target]

It is noted that a steady-state lateral acceleration for the vehicle body that is a vehicle riding comfort standard when travelling around a bend is of 0.8 meters per second squared or less. In this research, ensuring that steady-state lateral acceleration (excessive centrifugal acceleration) is always zero is taken to be the control target without taking into consideration physical restraints such as clearance limits in order to discuss dynamic usefulness of the system.

[Design of Controller]

A tilting control system is constructed using feedforward and feedback control controller in order to make use of the feature of railways that travelling always takes place on a predetermined route. A target value for the vehicle body tilting angle is then taken to be the following equation to ensure that excessive centrifugal acceleration is zero.

$$\phi_r = -V\dot{\psi}/g \qquad \text{[Equation 15]}$$

At this time, $k_\phi$ is nearly equal to $T_\phi$ in equation (4). The following equation can then be expressed when a transfer function from the input torque to the vehicle body tilting angle $\phi$ is taken to be $K_\phi = T_\phi$, $T_\theta = 0$.

[Equation 16]
$$P_{K\phi - T\phi}(s) = \frac{-J\Omega}{IJ_y s^3 + (J_y C + Ic)s^2 + (Ik + Cc + J^2\Omega^2)s + C_V k}$$

Figure 11:
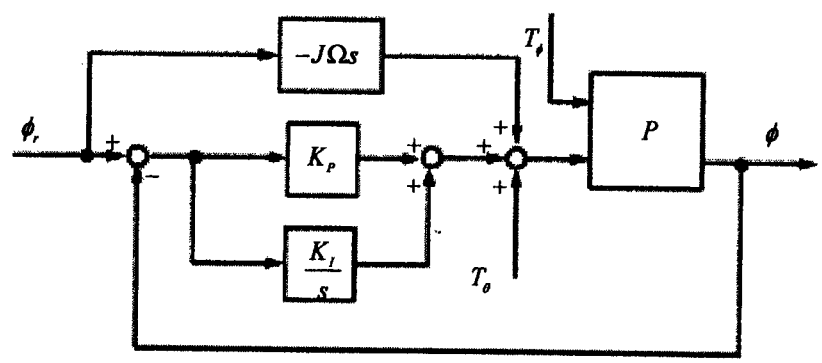
FIG. 11 is a block line of view of a tilting control system.

Because the dominant term occurring in $P^{-1}_{K\phi = T\phi}(S)$ is $-J\Omega_S$ in a range where angular velocity of rotation of the gyroscope is sufficiently large, by using feedforward, a torque of:

$$-J\Omega\dot{\phi}_r \qquad \text{[Equation 17]}$$

can be provided. The feedback controller is constructed using a PI controller. A block diagram for the tilting control system is shown in FIG. 11.

[Simulation Conditions]

Conditions used in simulations are shown in table 5. For vehicle data, please refer to Simulation of Travelling along Bends for a Tilting Vehicle, Mechanical Theory C, 63-612, 1997, 2671, by Hirotsu, Hiraishi, Terada, Shimada, and Yamada. The origin of the bend location is taken to be $R_0$=400 m, $C_0$=0.105 m, G=1.067 m, $X_L$=80 m. Travelling at 100 km/h is assumed with respect to a principle speed of 75 km/h for R0=400 m. Under the conditions of this simulation, this is approximately 1.1 rad/s because the angular frequency of the torque provided using feeding forward can be given to be $\omega = \pi V/X_L$. On the other hand, the value of the intrinsic angular frequency of the vehicle body tilting $\omega_\phi$ is approximately 1.6 rad/s. It can therefore be understood from equation (7), that the ratio of the angular momentum of the gyroscope with respect to the inertial moment of the vehicle is not necessarily large. It is necessary for the intrinsic angular frequency of the tilting of the vehicle body to be made small when suppressing angular displacement of gimbals. Most substantially effective way of doing this is to adjust the distance between the centre of the tilting of the vehicle body and the centre of gravity of the vehicle body. Simulation is carried out for an optimized distance between the tilting of the vehicle body and the centre of gravity of the vehicle body of l=0.286 m. Here, l=7.97 m is taken as an optimum solution but is not handled here because lateral displacement is large. The feedback gains are taken to be $K_I$=−100000 and $K_P$=−50000 respectively.

TABLE 1

Numerical values

| Symbol | Value | Symbol | Value |
|---|---|---|---|
| $m_v$ | $2.2 \times 10^4$ kg | $I_{g3}$ | 7.5 kg·m² |
| $m_a$ | $3 \times 10^2$ kg | l | 0.9 m (0.286 m) |
| $I_{g1}$ | $5 \times 10^4$ kg·m² | $C_v$ | 15.9 kN·m·s/rad |
| $I_{n1}$ | $4.65 \times 10^5$ kg·m² | c | 200 N·m/rad |
| $I_{\zeta 1}$ | $3.96 \times 10^5$ kg·m² | k | 0 N·m/rad |
| $I_{g3}$ | 7.5 kg·m² | Ω | $1.7 \times 10^4$ rpm ($1.0 \times 10^4$ rpm) |
| $I_{n3}$ | 7.5 kg·m² | | |

(value): value at l = 0.286 m

[Simulation Results]

Figure 12A:
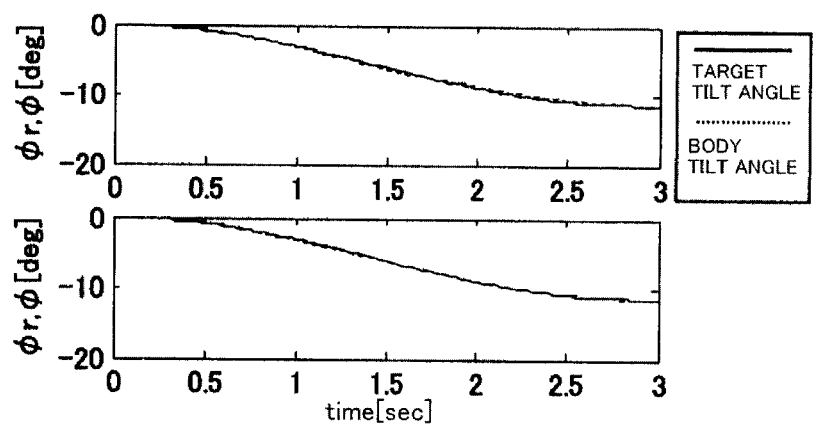
FIGS. 12A, 12B and 12C are views showing simulation results, where
Figure 12B:
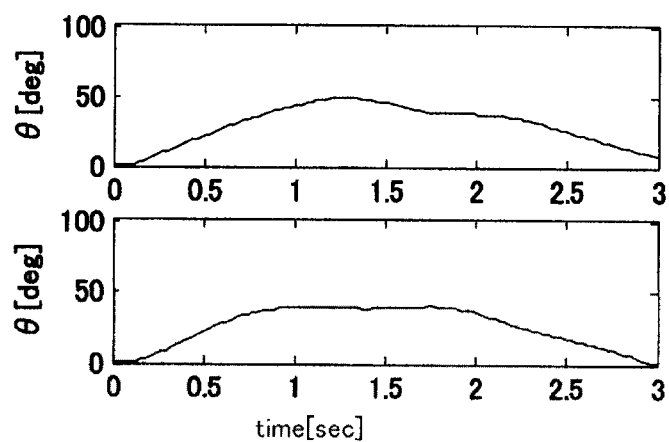
Figure 12C:
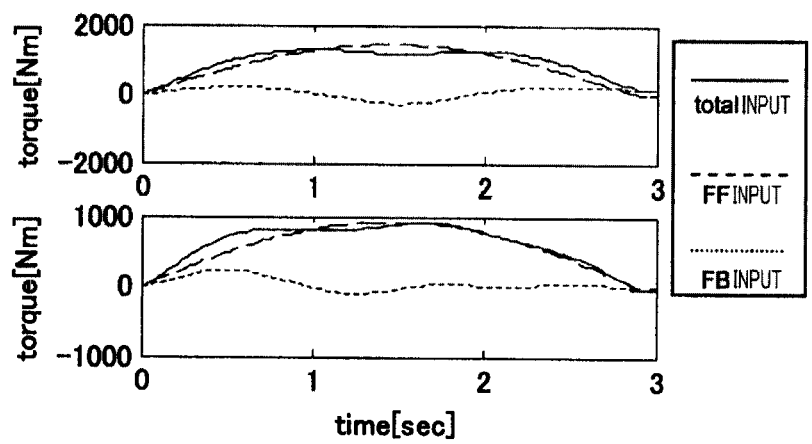
Figure 13:
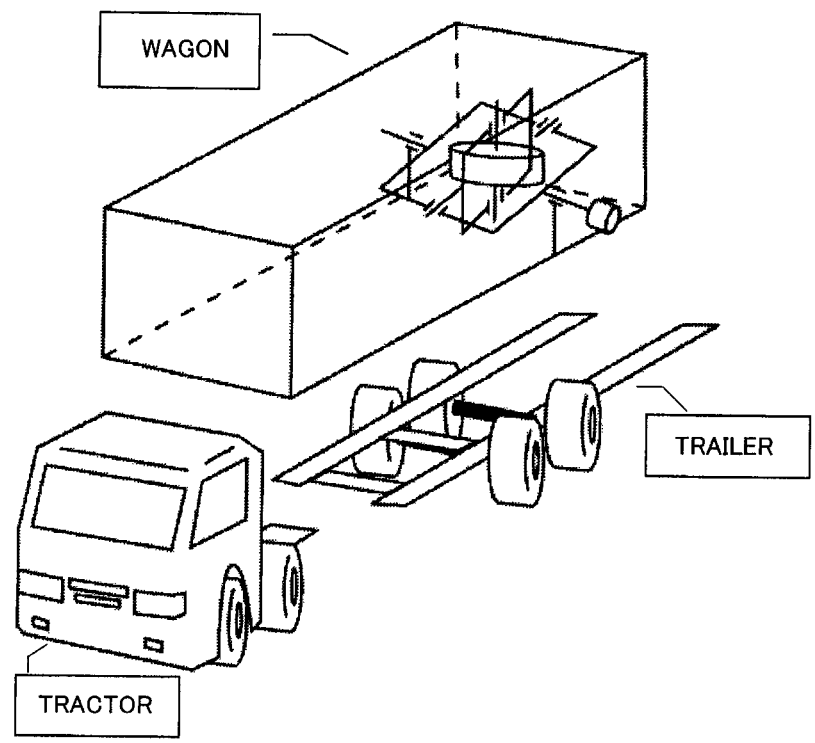
FIG. 13 is a view illustrating an arrangement of flywheel on a coupled vehicle where a tractor and a trailer are coupled by a coupling pin.
Figure 14:
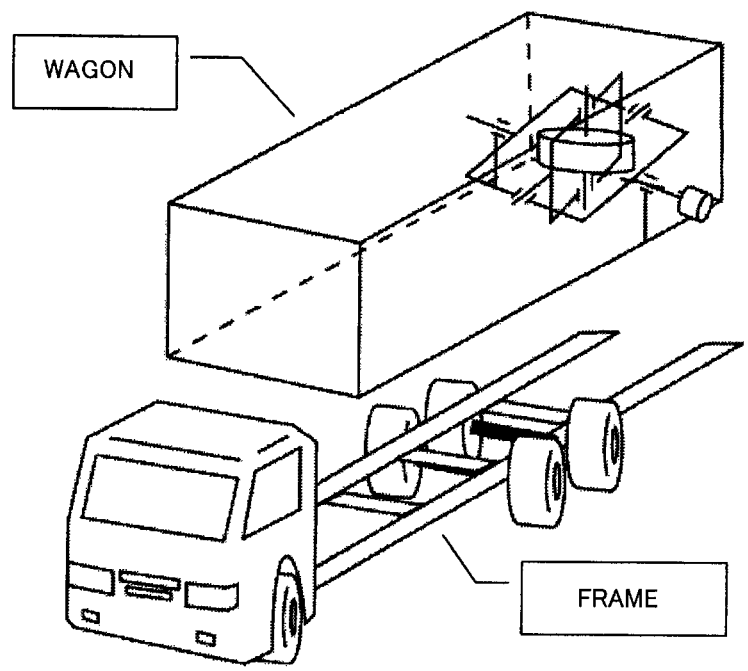
FIG. 14 is a view illustrating an arrangement of flywheel on a large type truck.

Controller is applied to the model expressed by equations (1) and (2) where approximation is not carried out and vehicle body tilt angle displacement, gimbal angle displacement, and inputted torque are obtained. Vehicle body tilt angle displacements is shown in FIG. 12A, gimbal angle displacement is shown in FIG. 12B, and inputted torque is shown in FIG. 12C. Results when l=0.9 m at the upper section and l=0.286 m at the lower section are shown. It can be understood from FIG. 12A that the vehicle body tilt angle can sufficiently follow the target value. FIG. 12C also shows that the necessary torque inputted about the gimbal shaft is a maximum at approximately 1300 Nm. Inertial moment while following the target value is:

$$(I_{g1} + m_V l^2)\dot{\phi}_r \qquad \text{[Equation 18]}$$

and the absolute value of the maximum value for the moment due to inertia occurring under these simulation conditions is:

$$(I_{g1} + m l^2) \cdot \pi^2 V^4/(2R_0 X_L^2 g) \approx 8.0 \times 10^3 \text{ Nm} \qquad \text{[Equation 19]}$$

It is therefore also show that the maximum required torque while making the excessive centrifugal acceleration zero by using a gyroscope can be made small. A tilting control system using feedforward/feedback controller was designed and numerical simulations were carried out using values measured for an actual vehicle in the derived dynamic model. It is therefore possible to sufficiently follow the target value and an estimated value for the required torque can be obtained. It can also be shown that the maximum required torque can be made smaller by having moment acting indirectly using the gyroscope compared to a case without using the gyro scope.

[C] Prevention of Rollover of the Trailer Using a Flywheel

According to a coupled vehicle, a tractor and a trailer are restrained using a pin referred to as a kingpin. In addition to the centre of gravity of the vehicle being high, this is a disadvantageous structure with respect to the rollover in the event of the unexpected such as at the time of abrupt steering etc. because lateral acceleration of the trailer side is delayed as to that of the tractor side. A description is now given here of a structure for improving rolling stability using a flywheel.

The flywheel is supported by a double gimbal with the x and y axes being free. Influence on the vehicle when travelling normally is therefore negligible. The flywheel is arranged at a trailer (a frame in a preferred aspect) such that the x-axis direction coincides with the direction of travel, i.e.

a direction from front to rear of the vehicle body. Flywheel may be provided as one flywheel per unit or two flywheels per unit and a plurality of such units may be provided.

When it is determined that there is the possibility of rollover such as at the time of abrupt steering, the gimbal shaft for the x-axis for the direction of travel is locked by the locking means and only the gimbal shaft for the y-axis is made to be free. It is therefore possible for rolling momentum acting on the trailer to be absorbed and for the lateral movement to be prevented as a result of the flywheel rotating about the y-axis. Alternatively, the gimbal shaft for the y-axis is actuated by the actuating means so as to rotate in a direction that cancels out the role moment acting on the trailer together with locking of the gimbal shaft for the x-axis for the direction of travel by the locking means and rollover is prevented.

The risk of rollover is detected by detecting means for detecting the risk of rollover of the vehicle. This is typically exemplified by a gyro sensor (that detects attitude angle or angular velocity) that detects the role angle of the roll rate or an acceleration sensor that detects lateral acceleration. A steering angle sensor, a vehicle wheel speed sensor, and a brake pressure sensor etc. can also be appropriately used in order to perform detection more accurately. A degree of risk differs depending on the weight of the vehicle and an air pressure sensor etc. can therefore be used to measure weight. In a specific preferred example, the risk of rollover is detected by a lateral direction acceleration detection means. When a detected value is larger than a predetermined value, an instruction is sent from the control unit to the locking means so as to lock the gimbal shaft for the x-axis. Alternatively, an instruction is sent from the control unit to the actuating means so as to rotate the gimbal shaft for the y-axis. Specific structure for lateral direction acceleration detection units are known to one skilled in the art and are disclosed, for example, in "New Roll/Stability Assist (RS assist) for large-type tractors", by Akira Yamamoto, the Society of Automotive Engineers of Japan, Motor Ring Vol. 19, JP 2000-159079 A, JP 2001-58563 A, and JP 2003-40095 A.

INDUSTRIAL APPLICABILITY

The present invention can be utilized as to device for controlling attitude during motion of an automobile, a large type truck, a trailer, or a railway vehicle etc.

The invention claimed is:

1. An attitude control device for a vehicle, said vehicle having a tilting function and mounted with a flywheel as an energy storage device,
said flywheel being pivotally supported about first and second axes mutually orthogonal with each other,
said flywheel being mounted on a body of the vehicle such that said first axis extends in a front-rear direction of the body,
said attitude control device comprising:
locking means for locking movement of the flywheel about said first axis;
an actuator for moving the flywheel about said second axis; and
a vehicle body tilter configured to actively tilt the vehicle body by moving the flywheel about said second axis using said actuator when the movement of the flywheel about said first axis is locked by said locking means;
wherein said attitude control device comprises one or more flywheel sets comprised of two flywheels rotating in different directions, and the second axes of said two flywheels are operatively connected such that said second axes rotate in different directions.

2. The attitude control device of claim 1, wherein said attitude control device comprises locking means for locking movement of the flywheel about the second axis.

3. The attitude control device of claim 1, wherein said vehicle is a railroad vehicle that travels along a predetermined route.

4. The attitude control device of claim 1, wherein said vehicle travels along a predetermined route and said device comprises a tilting control system using feedforward and feedback control.

5. The attitude control device of claim 1, wherein said vehicle is a naturally tilting vehicle.

6. The attitude control device of claim 1, wherein said vehicle is a forced tilting vehicle.

7. A vehicle, comprising:
a vehicle body; and
an attitude control device comprising:
a flywheel having a rotating mass, said flywheel being pivotally supported about first and second axes mutually orthogonal with each other, said flywheel being mounted on a body of the vehicle such that said first axis extends in a front-rear direction of the body;
locking means for locking movement of the flywheel about said first axis;
an actuator for moving the flywheel about said second axis; and
a vehicle body tilter comprising said flywheel, said locking means and said actuator to actively cause said vehicle to tilt when traveling along a bending section wherein said vehicle body tilter moves the flywheel about said second axis in a first direction selected depending on a direction of rotation of said rotating mass using said actuator and simultaneously locks movement of the flywheel about said first axis by said locking means.

8. The vehicle of claim 7, wherein said vehicle is a railroad vehicle that travels along a predetermined route.

9. The vehicle of claim 7, wherein said vehicle travels along a predetermined route and said device comprises a tilting control system using feedforward and feedback control.

10. The attitude control device of claim 1, wherein said vehicle is a naturally tilting vehicle.

11. The attitude control device of claim 1, wherein said vehicle is a forced tilting vehicle.

12. The vehicle of claim 7, wherein said movement of the flywheel about said second axis in the first direction and said locking of the movement of the flywheel about said first axis are initiated at a straight section prior to said bending section.

13. The vehicle of claim 7, wherein said vehicle body tiller locks movements of the flywheel about both said first axis and said second axis by said locking means at said bending section.

14. The vehicle of claim 8, wherein said vehicle body tiller controls tilling of the vehicle according to curvature of said bending section.

15. The vehicle of claim 7, wherein upon exiting said bending action, said vehicle body tilter moves the flywheel about said second axis in a second direction opposite to said first direction using said actuator.

* * * * *